United States Patent [19]

Sprung

[11] Patent Number: 4,770,347

[45] Date of Patent: Sep. 13, 1988

[54] AERATION ASSEMBLY FOR A NUTRIENT FEED SOLUTION FOR A NUTRIENT FILM PROPAGATION SYSTEM FOR PLANTS

[76] Inventor: Philip D. Sprung, c/o 1001 - 10th Avenue, SW., Calgary, Alberta, Canada

[21] Appl. No.: 947,696

[22] Filed: Dec. 30, 1986

[51] Int. Cl.4 .............................................. F23D 11/10
[52] U.S. Cl. .................................. 239/418; 239/428.5; 239/543; 47/59
[58] Field of Search ...................... 366/101; 239/428.5, 239/418, 428, 429, 430, 492, 453; 222/195; 210/210, 221.1, 221.2; 47/59, 60, 61, 62, 63, 64, 65, 48.5

[56] References Cited

U.S. PATENT DOCUMENTS

| | | | |
|---|---|---|---|
| 3,391,908 | 7/1968 | MacDonald | 366/101 |
| 3,660,933 | 5/1972 | Wong, Jr. | 47/62 |
| 4,163,457 | 8/1978 | Carlisle | 47/59 |
| 4,294,037 | 10/1981 | Mosse et al. | 47/59 |
| 4,521,117 | 6/1985 | Ouwerkerk et al. | 137/896 |

Primary Examiner—Robert A. Hafer
Assistant Examiner—Samuel Rimell
Attorney, Agent, or Firm—Kenyon & Kenyon

[57] ABSTRACT

There is provided a new and useful aeration assembly for a nutrient feed solution for a nutrient film propagation system for plants comprising a short tubular member having a pair of circular holes extending radially through the wall of the member: and a pair of feeder tubes extending through the openings and positioned to discharge solution generally along the inside wall of the member and respectively in opposite directions.

13 Claims, 2 Drawing Sheets

AERATION ASSEMBLY FOR A NUTRIENT FEED SOLUTION FOR A NUTRIENT FILM PROPAGATION SYSTEM FOR PLANTS

This application relates to an aeration assembly for a nutrient feed solution in a nutrient film propagation system for plants.

BACKGROUND OF THE INVENTION

Limited amounts of arable land and adverse environmental conditions, whether natural or man made, have resulted in the use for many years of closed environment structures. These have for the most part been greenhouses of the most basic type. However, over the years methods of plant husbandry and improved structures of the greenhouse type have been constantly under development.

One relatively recent advance in controlled environment husbandry has been the use of nutrient film techniques. In general terms these techniques involve the contacting of the bottom of a plant root system with a thin stream or film of nutrient solution. The solution soaks up through the remainder of the root system by wicking or capillary action. A great many external influences affect the relatively sensitive nutrient film technique. Efforts are now underway to control various of these influences to improve both the technical aspects and the economics of the systems.

One difficulty encountered in nutrient film systems is that of adequately aerating the nutrient solution. Particularly where the solution is moved through a lengthy piping system with decreasing pipe diameters, decreasing pressure allows entrained and absorbed gases to come out of solution.

Against this background, the present invention provides for aeration of the nutrient solution just prior to introduction to plant root systems. At the same time means is provided for visually monitoring nutrient solution flow.

PRIOR ART

The applicant is unaware of any prior art of relevance to this invention. In a number of earlier systems the importance of aeration of the nutrient feed solution has not been fully appreciated and thus no provision has been made for aeration.

SUMMARY OF THE INVENTION

An aeration assembly has now been developed which enables simple and thorough aeration of nutrient feed solution in a nutrient film propagation system and which feeds aerated solution directly to plant propagation trays. In the preferred embodiment the assembly automatically repositions itself to continue proper feeding as the plants develop.

Accordingly, the invention provides an aeration assembly for a nutrient feed solution for a nutrient film propagation system for plants comprising a short tubular member having a pair of holes extending radially through the wall of the member; and a pair of feed tubes extending through the openings and positioned to discharge solution generally against the inside wall of the member. Preferably, the discharge from the tubes is along the inside wall of the tubular member and respectively in opposed directions from the two tubes.

BRIEF DESCRIPTION OF THE DRAWINGS

In drawings which illustrated embodiments of the invention.

Figure 1:
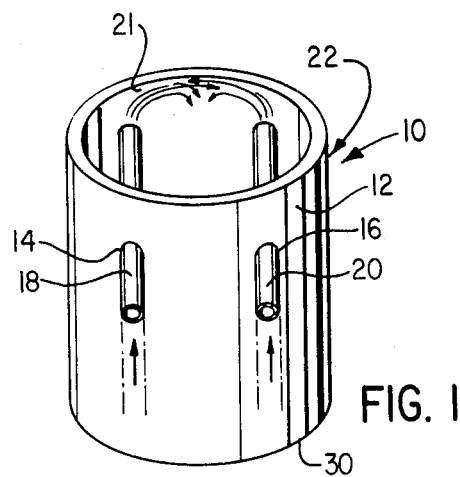
FIG. 1 is a perspective view of an aeration assembly according to the invention.
Figure 2:
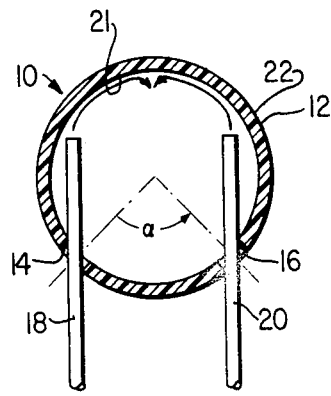
FIG. 2 is a sectional view of the assembly of FIG. 1.
Figure 3:
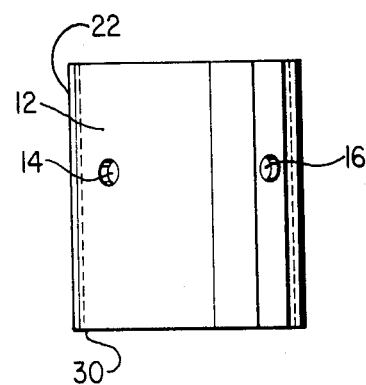
FIG. 3 is an elevation of the assembly of FIG. 1.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

The aeration assembly 10 comprises the tubular member 12, which is provided with openings 14 and 16 through the walls thereof, and the feeder tubes 18 and 20.

The member 12 is preferably a section of PVC pipe.

In use the tubular member 12 is preferably substantially vertically disposed, and the openings 14 and 16 are preferably circular and toward the top half 22 of the member 12.

The disposition of the openings can vary, but they are preferably at an angular distance from each other of ninety degrees and, as indicated, are preferably at approximately the same level of entry into the tubular member 12.

The feeder tubes 18 and 20 have a diameter just less than the diameter of the openings 14 and 16, so that the tubes may be inserted through the openings but jammed therein to be restrained by frictional engagement.

The angle of entry of feeder tubes 18 and 20 through the openings 14 and 16 is chosen so that the tubes will deliver nutrient solution against the inside wall 21 of member 12. In the preferred embodiment the nutrient solution will be delivered at an angle such that it will travel along the inside wall of the tubular member 12 initially substantially horizontally, so that the streams from the two tubes are in collision along the wall. The turbulence resulting from the collision with the wall and/or between the two streams provides very effective aeration for the nutrient solution. For this purpose the delivery of nutrient solution from the tubes 18 and 20 is preferably close to a direction tangential to the inside wall.

Should the direction of delivery of the nutrient solution vary from the tangential, the resulting impingement of the solution where it strikes the wall of the member 12 will in itself create turbulence and provide aeration.

Figure 4:
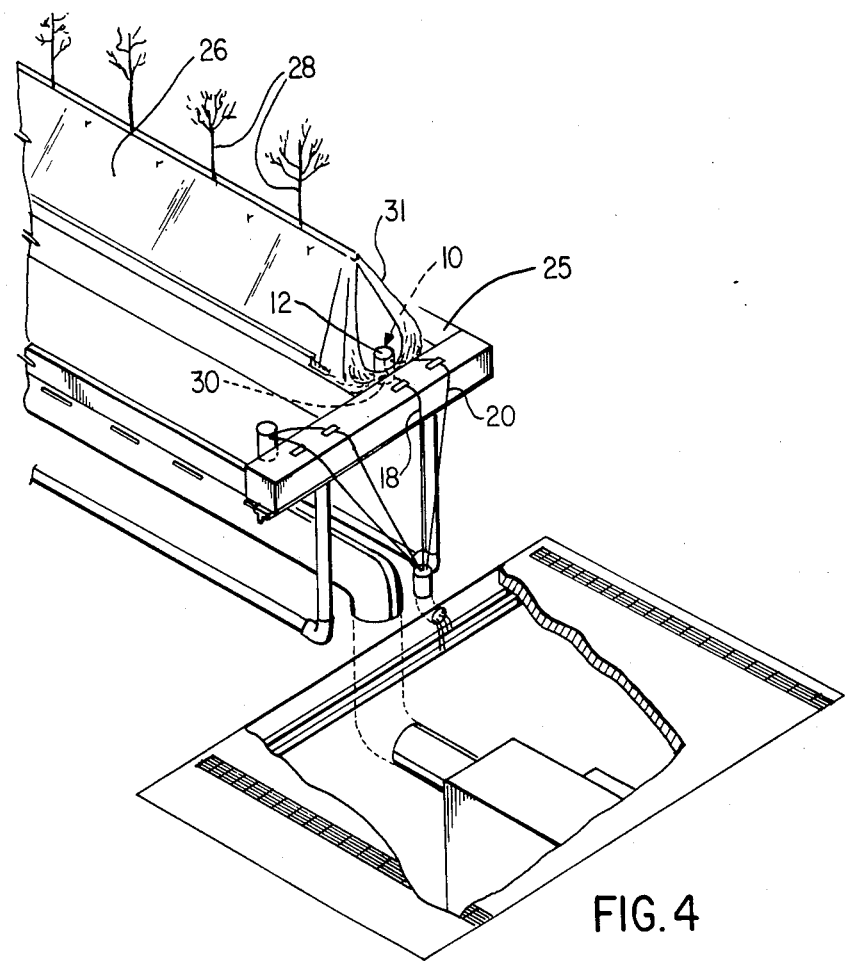
FIG. 4 illustrates the assembly in position of use in a plant propagation system.

The assembly is illustrated in its position of use in FIG. 4. In that drawing the plant support system 24 includes the growing tray 25 and the polyethylene sheet hydro canal 26 in which the plants 28 are being propagated. Within the hydro canal 26 the plants are either resting on their own root systems or are more likely embedded in individual growth cubes, preferably rock wool cubes. When the plants 28 are initially placed in the hydro canal, the root systems are not extensively developed but may to some extent extend out of the growth cube. At this point when the plants 28 are transplanted to the hydro canal 26 from nursery containers, the aeration assembly 10 is placed as illustrated in the end of the hydro canal 26. The bottom 30 of tubular member 12 simply sits on the developing plant root structure or on the like sheet 26 on the tray 25.

The sheath 31 is formed by the end of the canal 26 being rolled up and preferably clipped to prevent leakage.

Since the tubular member 12 is not restrained, and because the tubes 18 and 20 are preferably flexible, the tubular member 12 will simply ride upwardly as the root structure develops beneath it. It must be kept in mind, of course, that plant development in systems for which the assembly is designed is extremely rapid.

The ability of the assembly 10 to ride on the root structure has two important implications. First, the assembly can be placed right down into the hdyro canal to ensure proper delivery of nutrient solution at a controlled position. Second, the assembly will not become clogged by the developing root structure over time.

The asembly has other advantages. Clearly the delivery of nutrient solution from the tubes 18 and 20 can be very readily monitored visually by simply looking down into the top of tubular member 12 to ensure that there is no clogging of tubes 18 and 20.

Furthermore, the assembly can be very readily disassembled simply by removal of the tubes 18 and 20 to allow simple and thorough cleaning of tubular member 12.

Thus it is apparent that there has been provided in accordance with the invention an aeration assembly for a nutrient feed solution for a nutrient film propagation system for plants that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. An aeration assembly for a nutrient feed solution for a nutrient film propagation system for plants comprising
    a short tubular member having open ends for axial flow of air therethrough said tubular member having a pair of openings extending radially through a wall of said member; and
    a pair of feeder tubes extending through said openings and positioned to discharge solution in a blow stream generally against an inside wall of said member for aeration thereof, the solution from each said tube being directed circumferentially along the wall to a point of collision of the two flow streams.

2. The assembly of claim 1 in which said openings are at the same level of said tubular member.

3. The assembly of claim 2 in which said tubular member is substantially vertically disposed and said openings are toward one end thereof.

4. The assembly of claim 1 in which said feeder tubes are flexible.

5. The assembly of claim 1 wherein said discharge is substantially horizontal.

6. The assembly of claim 1 in which said tubular member is unrestrained.

7. The assembly of claim 1 in which said feeder tubes discharge solution generally along said inside wall of said member and in opposite circumferential directions.

8. The assembly of claim 1 in which said openings are circular in cross section.

9. The assembly of claim 8 in which the diameter of each said feeder tube is less than that of a respective opening.

10. The assembly of claim 1 in which said tubes are positioned to discharge solution substantially tangential to an inside of said wall of said tubular member and in opposite directions.

11. The assembly of claim 1 in which said openings are separated by an angular distance of ninety degrees.

12. The assembly of claim 1 in which said tubular member is a section of PVC pipe.

13. An aeration assembly for a nutrient feed solution for a nutrient film propagation system for plants comprising:
    a substantially vertically disposed tubular member having open ends and having at an upper level thereof a spaced pair of openings through a wall thereof; and
    a pair of flexible feeder tubes extending through said openings and positioned to discharge solution generally horizontally along an inside wall of said member and in opposite directions the solution from each said tube being directed circumferentially along the wall to a point of collision of the two flow streams;
    and wherein said tubular member is unrestrained.

* * * * *

UNITED STATES PATENT AND TRADEMARK OFFICE
CERTIFICATE OF CORRECTION

PATENT NO. : 4,770,347
DATED : September 13, 1987
INVENTOR(S) : PHILIP D. Sprung It is certified that error appears in the above-identified patent and that said Letters Patent is hereby corrected as shown below:

Column 4, line 2 "blow" should be -flow-
Column 4, line 45 "directions the" should be -directions; the- Signed and Sealed this Fourteenth Day of February, 1989

Attest:

DONALD J. QUIGG

Attesting Officer

Commissioner of Patents and Trademarks